March 8, 1932.    O. W. FISHER    1,849,001

MIRROR

Filed March 26, 1930    2 Sheets-Sheet 1

Inventor

O. W. Fisher

By Clarence A. O'Brien
Attorney

March 8, 1932.  O. W. FISHER  1,849,001
MIRROR
Filed March 26, 1930  2 Sheets-Sheet 2
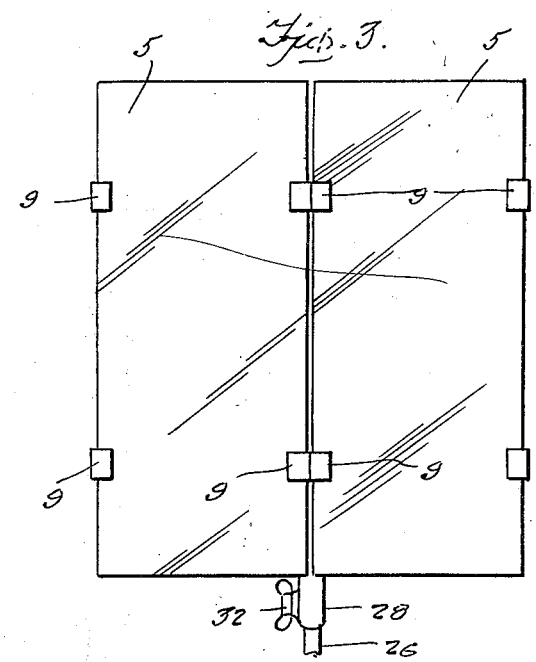
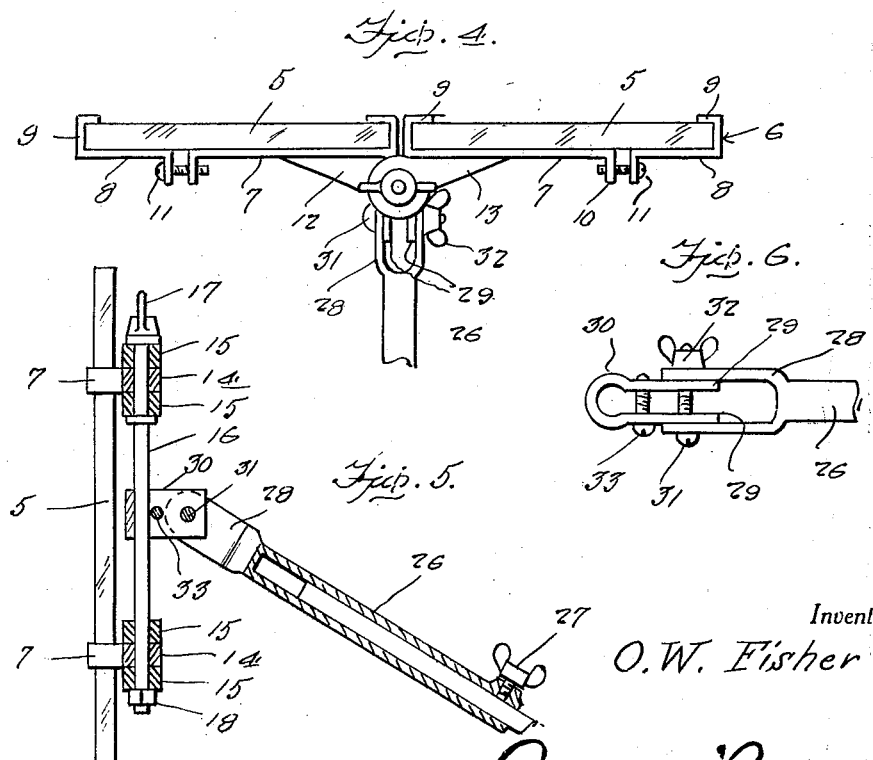
Inventor
O. W. Fisher
By Clarence A. O'Brien
Attorney Patented Mar. 8, 1932

1,849,001

UNITED STATES PATENT OFFICE

OLIVER W. FISHER, OF BATON ROUGE, LOUISIANA

MIRROR

Application filed March 26, 1930. Serial No. 439,134.

This invention appertains to new and useful improvements in mirrors and mirror mounts, particularly adapted for automobile use.

The principal object of this invention is to provide an adjustable mirror mount for automobiles, for reflecting the usual street intersection signal lights to the driver.

Another important object of the invention is to provide an adjustable and detachable mirror capable of being mounted in front of the driver of an automobile, whereby the driver may be able to observe himself or the occupant in the rear of the automobile, or to completely detach the mirror for the use of other occupants of the automobile.

These and various other important objects and advantages of the invention will become more apparent to the reader as this invention is described hereinafter.

In the drawings:—

Fig. 3 represents a top plan view of the novel mirror.

Fig. 4 is a fragmentary end elevational view of the mirror.

Fig. 5 is a fragmentary sectional view through the novel mirror and mount.

Fig. 6 is a fragmentary elevational view showing one end of the tubular post.

Figure 1:
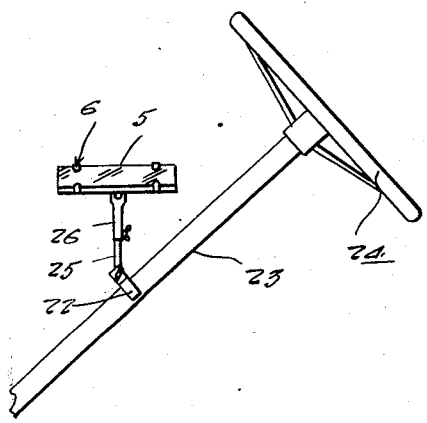
Figure 1 represents a side elevational view of an automobile wheel steering column with the mirror mounted thereon.
Figure 2:
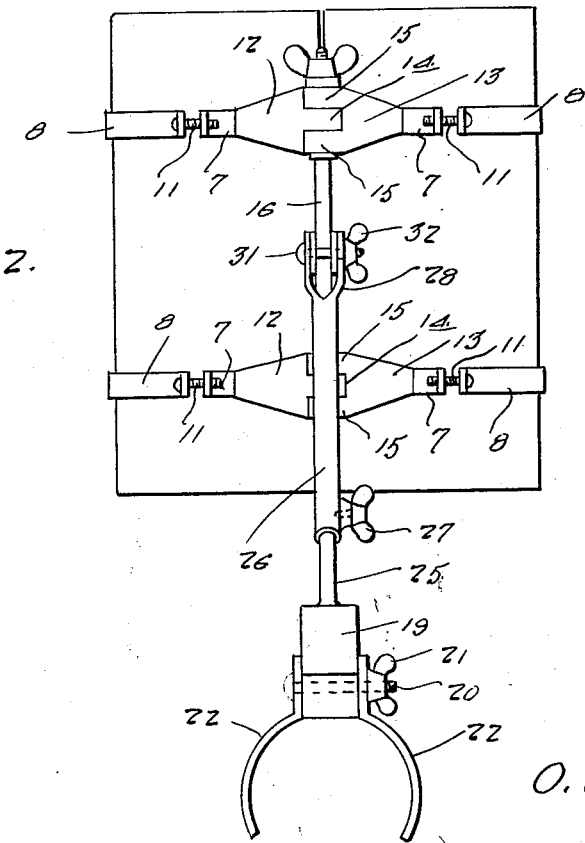
Fig. 2 represents a bottom plan view of the novel mirror and mount.

Referring to the drawings wherein like numerals designate like parts, it can be seen that the mirror comprises a pair of rectangular-shaped panels 5—5 of suitable reflectory construction. Each of the panels 5—5 has a pair of clamp structures 6 engaged thereon, each of these clamp structures comprising a pair of sections 7 and 8, each of which is provided with a hook 9 at one end and a lug 10 at its opposite end.

A bolt 11 connects the section of each clamp together at the ends provided with the lugs 10, as in the manner shown in Fig. 4. A hinge knuckle 12 is provided on each of the clamp sections 7 of one of the panels 5, while the clamp section 7 of the complementary panel clamps, are provided with hinge knuckles 13.

The hinge knuckles 12 are each provided with a single apertured ear 14 while the hinge knuckles 13 are provided each with a pair of apertured ears 15. Between the ears of each knuckle 13, the ear 14 of the complementary knuckle 12 engages, and as shown in Fig. 5, an elongated rod 16 extends through the alined openings of these ears for hingedly connecting the sections 5—5 together.

One end of the rod 16 is provided with a winged head 17, while the opposite end is provided with threads for engagement in the nuts 18. In this manner, the panels making up the mirror are hingedly connected together.

A block 19 has an opening therethrough for receiving the bolt 20 on which is located the winged nut 21. This bolt and nut serve to secure the arcuate-shaped jaws 22—22 against the block and against the steering column of the automobile in the manner shown in Fig. 1.

This steering column is denoted by numeral 23, and the usual steering wheel is denoted by numeral 24. The block 19 is provided with an elongated shank 25 which snugly engages within the tubular section 26.

A winged set screw 27 is capable of biting into the shank 25 to maintain adjustment between the shank and the tubular section 26. The upper end of the tubular section 26 is provided with a yoke 28 between which the legs 29 of the U-shaped member 30 are engageable and held by the bolt 31 and nut 32.

The bight portion of the U-shaped member 30 is semi-circular in shape to circumscribe the rod 16, and obviously by adjusting the screw 33, the legs of the U-shaped member may be conducted to bind the member against the rod 16 to maintain adjustment.

The mirror sections may be shifted to the position shown in Fig. 5 or the individual panels may be swung downwardly on opposite sides of the tubular sections 26. Besides various adjustments may be made to get the proper angle on the signal light or to permit the mirror sections to perform various functions.

By unloosening the wing nut 27, the entire mirror may be removed from the shank 25 and used by the occupants of the automobile for personal attention. Obviously, the mirror may be elevated by unloosening the wing nut 27 so that the tubular section is slid upwardly on the shank 25 to the required height.

Numerous changes in the shape, size, materials may be resorted to without departing from the spirit and scope of the invention as claimed hereinafter.

Having thus described my invention, what I claim as new is:—

A mirror comprising a pair of mirror sections, apertured ears on the sections disposed in overlapping relation to each other, a rod disposed through the ears, means on the rod for urging the ears frictionally together, a supporting arm, a clamp interposed between the arm and the said rod, said clamp being adjustable longitudinally on the said rod.

In testimony whereof I affix my signature.

OLIVER W. FISHER.